United States Patent [19]

Villavicencio, Jr. et al.

[11] 4,450,966
[45] May 29, 1984

[54] SURVIVAL KIT

[76] Inventors: Enrique Villavicencio, Jr.; Enrique Villavicencio, Sr., both of Chimalpopoca 48, Iztacalco, Mexico, 08620

[21] Appl. No.: 359,868

[22] Filed: Mar. 19, 1982

[51] Int. Cl.³ .............................................. C02F 1/18
[52] U.S. Cl. ...................................... 206/547; 270/8; 206/803; 215/100.5; 138/119; 141/387; 202/83; 203/10; 203/DIG. 16
[58] Field of Search ............... 206/547, 803; 220/375, 220/8; 203/10, DIG. 17, DIG. 16; 138/119, 120; 202/83, 185 R, 190, 215; 141/382-389; D3/30; D7/77; D9/337, 369, 384; 215/1 A, 228, 229, 100.5, DIG. 7; 229/7 S; 285/298, 302

[56] References Cited

U.S. PATENT DOCUMENTS

| | | | |
|---|---|---|---|
| 698,958 | 4/1902 | Jester | 203/DIG. 17 |
| 1,170,182 | 2/1916 | Pape | 217/113 |
| 1,199,147 | 9/1916 | Baldwin . | |
| 1,477,261 | 12/1923 | Hart | 220/375 |
| 2,095,702 | 10/1937 | Johnson | 138/120 |
| 2,180,561 | 11/1939 | Stevens | 206/547 |
| 2,357,869 | 9/1944 | Beckwith . | |
| 2,424,824 | 7/1947 | Hermo et al. . | |
| 2,724,536 | 11/1955 | Pugh | 215/1A |
| 2,814,380 | 11/1957 | Thaxton, Jr. | 206/547 |
| 3,072,285 | 1/1963 | Aileo | 206/803 X |
| 3,351,536 | 11/1967 | Fox | 202/83 |
| 3,474,833 | 10/1969 | Garrette, Jr. et al. | 138/120 |
| 3,672,959 | 6/1972 | Sweet . | |
| 4,251,019 | 2/1981 | Cone | 229/7 S |

FOREIGN PATENT DOCUMENTS 76699 8/1981 Mexico .
1504515 3/1978 United Kingdom .

Primary Examiner—Steven M. Pollard
Assistant Examiner—Bryon Gehman
Attorney, Agent, or Firm—Martin P. Hoffman; Mitchell B. Wasson

[57] ABSTRACT

A survival kit comprising, inter alia, a replacement cap for a conventional canteen, a gasket, and a collapsible tube. The cap includes a crown and an annular depending skirt; a passage is defined clear-through the crown and the skirt is internally screw threaded so that the cap can be secured to the threaded neck of a canteen. The gasket is a flat annular washer with a central aperture. The collapsible tube is formed of several telescoping sections and one end of the tube is threaded.

When the survival kit is utilized to obtain potable water from salt water, contaminated water, vegetable matter, etc., the cap of the canteen is removed, and the collapsible tube is removed from the interior of the canteen. The gasket is positioned atop the neck of the canteen, and the replacement cap is secured thereover after partially filling the canteen. The collapsible tube is extended, and the threaded end thereof is secured within the aperture in the replacement cap. Heat is applied to the canteen, as from a camp fire, and the steam issuing from the canteen is cooled to form droplets of moisture within the extended tube. The condensed moisture is collected at the end of the tube in a receptacle.

1 Claim, 4 Drawing Figures

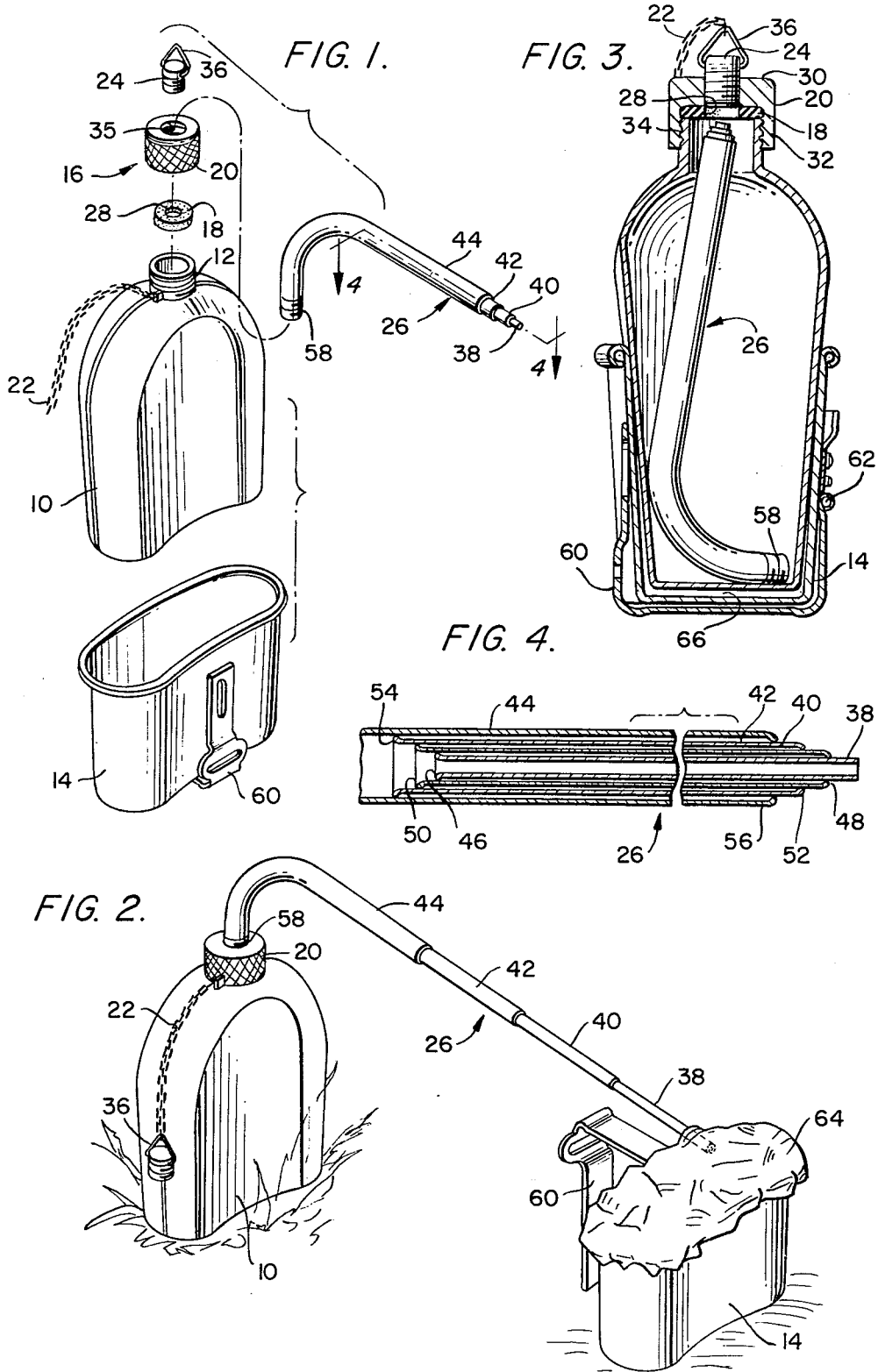

SURVIVAL KIT

BACKGROUND OF THE INVENTION

1. Field of the Invention

The instant invention relates broadly to survival kits for use in the outdoors, under emergency conditions, and more particularly to a re-usable survival kit including a limited number of components which are utilized in conjunction with existing canteens.

2. Prior Art

Diverse survival kits have been utilized by outdoorsman, by the military, and the like, to insure that the user can obtain potable water from the environment even under adverse climatic conditions. Many of these survival kits utilize specially-formulated tablets to chemically treat contaminated water, salt water, etc. and render same potable.

Such tablets, however, may be lost or misplaced, and their efficacy may diminish with time and exposure to the elements. Furthermore, such tablets are limited for use with contaminated liquids, and cannot be used to extract potable water from vegetable matter, such as cactus, roots, moss, green plants, etc. or from damp soil. Also, once the supply of tablets is exhausted, the kit is valueless.

SUMMARY OF THE INVENTION

The instant invention contemplates a survival kit comprising a limited number of simple, readily fabricated components that can be utilized with conventional canteens. Furthermore, the survival kit is capable of converting contaminated water into potable water as well as extracting potable water from vegetable matter, plants, and the like. Thus, the survival kit can be used under all kinds of environmental and climatic conditions, and is well suited for use in arid or semi-arid areas. Furthermore, the components of the survival kit, prior to use, are stored within or upon a conventional canteen, and are consequently always available for utilization in emergencies. The components of the kit can be readily joined together in operative relationship, function effectively, and can, if required, be re-used several times.

BRIEF DESCRIPTION OF THE DRAWINGS

FIG. 1 is an exploded perspective view of a conventional canteen, a receptacle, and the components of the survival kit constructed in accordance with the principles of this invention;

FIG. 2 is a perspective view of the canteen, receptacle, and survival kit of FIG. 1 in operative condition;

FIG. 3 is a vertical, cross-sectional view of the canteen, receptacle, and survival kit of FIG. 1 in its normal, stored position; and FIG. 4 is a horizontal cross-sectional view on an enlarged scale of a portion of the collapsible tube of the survival kit, such view being taken along line 4—4 in FIG. 1 and in the direction indicated.

BRIEF DESCRIPTION OF THE DRAWINGS

Turning now to the drawings, FIGS. 1 and 2 depict a conventional, flame resistant metal canteen 10 with a screw threaded neck 12; a receptacle 14 with curved sidewalls is adapted to receive the canteen 10. The survival kit constructed in accordance with the principles of this invention is indicated generally by reference numeral 16.

Kit 16 includes an annular washer 18 that fits atop the upper end of neck 12 of the canteen, a unique replacement cap 20, a keeper chain 22, plug 24, and a collapsible tube 26. A central aperture 28 is defined in the washer 18. The unique replacement cap 20 has an upper crown 30 and a depending skirt 32 with internal screw threads 34, as shown in FIG. 3. A passage 35 extends clear-through crown 30; the passage is threaded. The keeper chain 22 is secured about the lower end of the neck of the canteen 10, and the plug 24, which has external threads 25, is secured by clip 36 to the free end of chain 24.

The collapsible tube 26, as shown in FIGS. 1 and 4, comprises a central core 38, a first telescoping section 40, a second telescoping section 42, and a third telescoping section 44. Each telescoping section is slightly larger in diameter than the section about which it is seated. The inner end of core 38 is outwardly flared to form flange 46, while the free end of telescoping section 40 is inwardly curved to form a cooperating stop 48. The inner end of first telescoping section 40 is outwardly flared to form flange 50, while the free end of telescoping section 42 is inwardly curved to form a cooperating stop 52. The inner end of second telescoping section 42 is outwardly flared to form flange 54, while the free end of third telescoping section 44 is inwardly curved to form a cooperating stop 56. The inner end of third telescoping section 44 is shaped like an elbow and has external threads 58 on its lower end.

The tube 26 is sized and shaped so that it is normally stored in its compact, collapsed condition within the interior of canteen 10, as shown in FIG. 3. The collapsed tube can be inserted through the neck of the canteen into its interior. The enlarged end of the third telescoping section 44 rests upon the base of the canteen while the free end of core 38 fits within the neck. Since the collapsible tube 26 can be carried conveniently within the confines of the canteen, this vital component of the survival kit cannot be overlooked, lost or easily forgotten, even by the least experienced camper, outdoorsman, etc.

The receptacle 14, which opens upwardly to receive the canteen 10 with the components of the survival kit secured thereto and/or positioned therewithin, has a handle 60 secured thereto by a shaft 62. The handle is shaped so that it normally rests against the exterior of receptacle 14, as shown in FIG. 1. However, when the survival kit is deployed, the handle 60 is pivoted about shaft 62 to assume the position shown in FIG. 2. Slidable locking means (not shown) may temporarily lock the handle in a fixed position.

A sheet of metallic foil 64 may be stored in the cavity 66 defined between receptacle 14 and canteen 10. The aluminum foil may be used to cover the open upper end of receptacle 14 and retain the free end of tube 26 in position against the upper lip of the receptacle. Although metallic foil 64 is peferred, so-called cheesecloth, and other materials will also perform satisfactorily.

The present survival kit 16 functions in the following manner. Prior to leaving on a journey, the user removes the threaded cap (not shown) provided for conventional canteen 10 and inserts tube 26, in its collapsed condition, into the interior of canteen 10. The washer 18 is seated atop neck 12 of the canteen, and the unique replacement cap 20 is screwed onto the neck of the canteen, compressing washer 18 and retaining same in position. The plug 24 is then screwed into the threaded passage 35 in the crown of the replacement cap 20.

When the contents of the canteen have been drained, and the user needs potable water, he unscrews cap 20 and removes tube 26 from the interior of the canteen. The canteen is filled to seventy percent of its capacity with contaminated water, vegetable mass, or the like. The tube 26 is then extended to its full length, as shown in FIG. 2, wherein the outwardly flared flange of each concentric section 38, 40, 42, 44 engages the inwardly projecting stop of the adjacent section. Plug 24 is unscrewed from passage 35 in replacement cap 20, and the threaded end 58 of the tube 26 is engaged with the threads surrounding passage 35 by rotating the tube 26 relative thereto.

The partially filled canteen is then placed on a fire so that the moisture in the contents of the canteen is converted to steam. The steam exits the canteen through the central aperture in washer 18 and enters the tube 26, which has been fully extended. The tube, which is fabricated from aluminum or other heat radiating metals, allows the steam to expand and cool sufficiently so that moisture condenses as droplets within the tube. The droplets drain through the tube and are collected in receptacle 14. To facilitate the drainage process, the canteen is placed at a higher elevation than the receptacle, and the curvature of section 44 of the tube is selected so that the inner core slopes downwardly, as suggested in FIG. 2. The metallic foil is wrapped about the free end of core 38 to hold same against the lip of receptacle 14 and to keep dirt, dust, and the like from entering the receptacle.

A preferred embodiment of the instant survival kit has been described in detail supra. However, numerous changes, revisions and modifications to the kit will occur to the skilled artisan; for example, the washer 18 may be press fitted within the replaceable cap rather than being a separate component. Also, passage 35 in the replaceable cap may assume the form of a smooth, unthreaded bore; the inner end of tube 40 could then be fitted into the bore and retained in position by an O-ring or similar resilient element. Consequently, the appended claims should not be limited to their exact terms, but should be broadly construed in a manner commensurate with the scope of the invention.

We claim:
1. A survival kit for use in combination with a canteen,
  (a) said canteen including a hollow body, a base, and a neck, said body being made of flame resistant material and said neck having external threads,
  (b) a receptacle for collecting moisture,
  (c) said survival kit comprising:
    (1) a cap including a crown and a depending skirt, said crown having a passageway defined therethrough and said skirt having internal threads,
    (2) a removable plug that fits within said passageway in said cap,
    (3) an elongated metal tube comprised of an L-shaped outer section and plurality of smaller telescoping sections of different dimensions,
    (4) said metal tube being sized at one end to fit within said passageway in said cap when said plug has been removed therefrom,
    (5) the telescoping sections of said metal tube being extensible to a length several times greater than its normal, collapsed length,
    (6) said metal tube, when extended, functioning to condense moisture from any steam generated within the canteen and to lead same to the receptacle for collection therein,
    (7) said metal tube, in its normal, collapsed condition, being stored completely within the body of said canteen with the L-shaped outer section resting on the base of the canteen and the telescoping sections projecting upwardly into the neck of the canteen, whereby said metal tube can be readily extracted from the canteen for use in emergency conditions.

* * * * *